UNITED STATES PATENT OFFICE.

MANFRED ALIOTH AND ERNST BODMER, OF BASEL, SWITZERLAND, ASSIGNORS TO DURAND & HUGUENIN S. A., OF BASEL, SWITZERLAND, A CORPORATION OF SWITZERLAND.

DYESTUFFS DYEING ON MORDANT AND PROCESS OF MAKING SAME.

1,403,888.  Specification of Letters Patent.  Patented Jan. 17, 1922.

No Drawing.  Application filed July 12, 1921. Serial No. 484,155.

*To all whom it may concern:*

Be it known that we, MANFRED ALIOTH and ERNST BODMER, both citizens of the Swiss Republic, and residents of Basel, Switzerland, have invented new and useful Dyestuffs Dyeing on Mordant and Process of Making Same, of which the following is a full, clear, and exact specification.

We have found that by oxidizing one molecule of methylene-dianilidosalicylic acid resulting from the action of formaldehyde on anilido-salicylic acid (see Annalen, 210, page 342) together with one molecule of salicylic acid, there is obtained a new dyestuff dyeing on mordant.

This dyestuff is distinguished from the analogous not anilidated already known product (see Berichte der deutschen Chemischen Gesellschaft, vol. 25, page 939), that is to say, the aurinetricarboxylic acid, by its more red tint and it is suitable for dyeing chromed wool.

Concerning its application for printing purposes we have found that it gives dull and little intense tints, but that his sulfoderivative gives, when printed with chromium, far more vivid, more intense and more fast tints than those given by the nonsulfonated body. The sulfo group enters probably the aniline nucleus.

There is consequently a great advantage to sulfonate the new body and the dyestuff derived therefrom will be an interesting representative of the chromium dyeing dyestuffs either for cotton printing or for dyeing chromed wool.

Obviously the process is not limited to the above defined product. Instead of salicylic acid there can be employed for instance o-cresotinic acid, generally any o-oxycarboxylic acid of the aromatic series, as well for the preparation of a methylene-di-anilido-o-oxycarboxylic acid as for the component to be oxidized with this latter methylene derivative.

For the substitution of the carboxylic group there can be employed, instead of aniline, an aniline-derivative containing $NO_2$, a halogen, $CH_3$ etc., as substituent in the nucleus, in other words, any aromatic amine having at least one free amino-group.

Broadly spoken, the process shows the 4 following steps:

1. The anilidation of the o-oxycarboxylic acid.

2. The reaction of the formaldehyde on the anilidated product for forming a methylene derivative of the anilido-o-oxycarboxylic acid.

3. The oxidation of one molecule of methylene - dianilido - o - oxycarboxylic acid together with one molecule of o-oxycarboxylic acid.

4. The sulfonation of the dyestuff.

Nevertheless the invention is not limited to the succession of steps in the above given order. For instance, the salicylic acid can at first be anilidated and the resulting anilido-salicylic acid be condensed afterwards with formaldehyde, or the salicylic acid can be condensed at first with formaldehyde and the resulting methylene-disalicylic acid be anilidated afterwards, in order to obtain in both cases the methylene-dianilido-salicylic acid.

Shortly the invention relates to the manufacture of dyestuffs corresponding probably to the general formula:

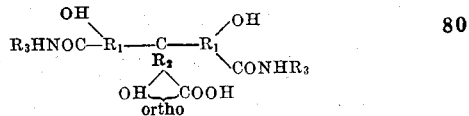

wherein $R_1$ and $R_2$ designate each an aromatic nucleus which may still contain substituents other than those already indicated in the formula and $R_3$ an aromatic nucleus, substituted or not, but, if substituted, preferably substituted by a sulfo group.

Example I.

106.5 kg. of anilido-salicylic acid are dissolved at 20 to 25° C. in 700 kg. of sulfuric acid of 66° Baumé. To this solution are added, while stirring, at ordinary temperature, 7.5 kg. of paraformaldehyde and the stirring is continued for several hours. Then there are added, while stirring, 34.5 kg. of salicylic acid and, after dissolution of this latter, the mass is oxidized by addition of 30 kg. of sodium nitrite.

This addition is effected by little portions and the temperature is maintained, during the oxidation, at 30 to 50° C. When the oxidation is terminated, the mass is cooled down and poured into ice water. The red dyestuff precipitates, it is filtered off, washed until neutrality with cold water and dried. The yield is 135 to 140 kg. of acid dyestuff.

Solubilized by its mixture with sodium carbonate, the product can be employed for dyeing chromed wool. For its sulfonation, the dyestuff is dissolved in a fivefold quantity of sulfuric acid of 66° Bé. The red solution thus obtained is heated for 1 to 2 hours at 90 to 95° C. until a sample of the mass dissolves in cold solution of sodium acetate. The mass is then cooled down and poured into salt water, the dyestuff is separated from the liquid and washed with salt water until neutrality. The dyestuff is for its most part soluble in water, it becomes entirely soluble by addition of a little sodium carbonate. It has the above mentioned properties.

Example II.

The same dyestuff can be obtained by anilidating the methylene-disalicylic acid and oxidizing the reaction product together with salicylic acid.

To this purpose, 20 kg. of methylene-disalicylic acid (Berichte der deutschen Chemischen Gesellschaft, vol. 31, page 148) are suspended in 100 kg. of benzene and to this suspension are added 18 kg. of aniline and progressively 10 kg. of phosphorus trichloride. The mass is boiled until the escapement of hydrochloric acid ceases, it is then cooled down and the solid product separated from the liquid. The product thus obtained is first washed with dilute hydrochloric acid and afterwards with water and dried.

8 kg. of this product are dissolved in 50 kg. of sulfuric acid of 66° Baumé; to the resulting brown solution are added 2.7 kg. of salicylic acid. After dissolution the mass is oxidized with 1.2 kg. of sodium nitrite, while heating progressively to 40° C. At the end, the mass is still maintained for 1 hour, at 50 to 55° C., it is then cooled down and poured into ice water.

The red product is separated from the liquid and washed until neutrality. It is identical with the non-sulfonated dyestuff of Example I.

Example III.

23 kg. of anilido-o-cresotinic acid (Berichte der deutschen Chemischen Gesellschaft, vol. 35, page 3645) are dissolved in 150 kg. of sulfuric acid of 66° Baumé. To the solution thus obtained are added, at low temperature, 1.5 kg. of paraformaldehyde and the mass is stirred for several hours at ordinary temperature. Then 7.6 kg. of o-cresotinic acid are added and after dissolution of this latter the mass is oxidized at 30 to 50° C. with 6 kg. of sodium nitrite in the course of 3 to 4 hours. After cooling, the mass is poured into ice water. The separation and the sulfonation are carried out as indicated in Example I. There are obtained 30 kg. of a deep-red powder giving, when dyed on chromed wool and when printed on cotton with a chromium mordant, a red shade more-bluish than that obtained with the dyestuff of Example I.

Example IV.

25 kg. of paranitranilido-salicylic acid (Beilstein II, page 1500; Jahresberichte über die Fortschritte der Chemie, 1875, page 747) are dissolved at 15 to 20° C. in 150 kg. of sulfuric acid of 66° Bé. and to the solution thus obtained there are added, at low temperature, 1.5 kg. of paraformaldehyde. The mass is stirred at ordinary temperature for 5 hours and abandoned to itself during a night. The next day, there are added 7 kg. of salicylic acid and after dissolution the mass is oxidized at 30–40° C. with 6 kg. of sodium nitrite. At the end, the mass is maintained for 2 hours at 50 to 55° C., then cooled down and poured into ice water. The dyestuff is then separated from the liquid and washed until neutrality. It is mixed with sodium carbonate. When dyed on chromed wool, it gives red tints, somewhat more yellowish than those obtained with the product of Example II. For the preparation of the sulfonated dyestuff one proceeds in the same manner as in Example I.

What we claim is:

1. The herein described process for the manufacture of new red dyestuffs dyeing on mordant, consisting in oxydizing one molecule of an aromatic o-oxycarboxylic acid together with one molecule of an aromatic methylene-diarylido-o-oxycarboxylic acid.

2. The herein described process for the manufacture of new red dyestuffs dyeing on mordant, consisting in arylidating an aromatic methylene-di-o-oxycarboxylic acid and oxidizing one molecule of the aromatic methylene-diarylido-o-oxycarboxylic acid thus obtained together with one molecule of an aromatic o-oxycarboxylic acid.

3. The herein described process for the manufacture of new red dyestuffs dyeing on mordant, consisting in arylidating an aromatic o-oxycarboxylic acid, reacting with formaldehyde on the arylido-o-oxycarboxylic acid thus obtained and oxidizing one molecule of the resulting aromatic methylene-diarylido-o-oxycarboxylic acid together with one molecule of an aromatic o-oxycarboxylic acid.

4. The herein described process for the manufacture of new red dyestuffs dyeing on mordant, consisting in oxydizing one molecule of an aromatic o-oxycarboxylic acid together with one molecule of an aromatic methylene-diarylido-o-oxycarboxylic acid and sulfonating the dyestuff thus obtained.

5. The herein described process for the manufacture of new red dyestuffs dyeing on mordant, consisting in arylidating an aromatic methylene-di-o-oxycarboxylic acid, oxidizing one molecule of the aromatic methylene-diarylido-o-oxycarboxylic acid thus obtained together with one molecule of an aromatic o-oxycarboxylic acid and sulfonating the dyestuff thus obtained.

6. The herein described process for the manufacture of new red dyestuffs dyeing on mordant, consisting in arylidating an aromatic o-oxycarboxylic acid, reacting with formaldehyde on the resulting arylido-o-oxycarboxylic acid, oxidizing one molecule of the aromatic methylene-diarylido-o-oxycarboxylic acid thus obtained together with one molecule of an aromatic o-oxycarboxylic acid and sulfonating the dyestuff thus obtained.

7. As new products, the herein described red dyestuffs corresponding to the formula:

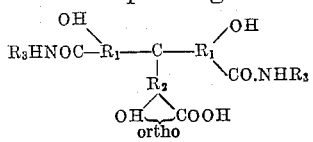

wherein $R_1$, $R_2$, $R_3$ stand each for an aromatic nucleus, which may be substituted, the said dyestuffs dyeing chromed wool red tints of good fastness.

8. As new products, the herein described red sulfonated dyestuffs corresponding to the formula:

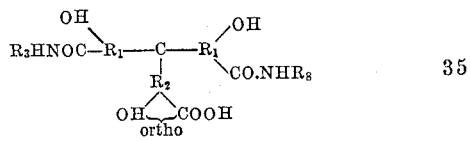

wherein $R_1$ and $R_2$ stand each for an aromatic nucleus, which may be substituted, whilst $R_3$ stands each for an aromatic nucleus substituted by a sulfo group, the said dyestuffs giving, when dyed on chromed wool and when printed on cotton with chromium mordants red vivid tints of good fastness.

In witness whereof we have hereunto signed our names this 24th day of June, 1921, in the presence of two subscribing witnesses.

MANFRED ALIOTH.
ERNST BODMER.

Witnesses:
FRIDK. KURZ,
AMAND BAUER.